(12) United States Patent
Suzuki et al.

(10) Patent No.: US 7,497,011 B2
(45) Date of Patent: Mar. 3, 2009

(54) HOOP MOLDING METHOD

(75) Inventors: Koji Suzuki, Aichi-ken (JP); Fusatomo Miyake, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 298 days.

(21) Appl. No.: 11/290,512

(22) Filed: Dec. 1, 2005

(65) Prior Publication Data

US 2006/0120025 A1 Jun. 8, 2006

(30) Foreign Application Priority Data

Dec. 2, 2004 (JP) ............................. 2004-350384

(51) Int. Cl.
*H01R 43/00* (2006.01)
(52) U.S. Cl. ............................. 29/883; 29/827; 29/882; 174/529; 174/551; 246/272.11; 361/813
(58) Field of Classification Search .................. 29/827, 29/832, 834, 835, 840, 841, 846, 847, 874, 29/882–884; 174/529, 534, 551; 257/676, 257/666, 670; 264/614–619, 272.11; 361/723, 361/813
See application file for complete search history.

(56) References Cited

U.S. PATENT DOCUMENTS 4,536,825 A * 8/1985 van Dyk Soerewyn ...... 361/813
4,733,455 A * 3/1988 Nakamura et al. ............ 29/827
5,834,691 A * 11/1998 Aoki .......................... 257/670

FOREIGN PATENT DOCUMENTS

JP 2001-052556 2/2001

* cited by examiner

*Primary Examiner*—Donghai D. Nguyen
(74) *Attorney, Agent, or Firm*—Roberts Mlotkowski Safran & Cole, P.C.; Thomas W. Cole

(57) ABSTRACT

A hoop molding method comprises forming, in the frame portions, connection portions that link, to the frame portions, at least one molded portion of the at least one bent molded portion or at least another molded portion other than the at least one bent molded portion such that it is displaceable in a direction toward another molded portion along the width direction of the parent material, and displacing the at least one molded portion of the at least one bent molded portion or the at least another molded portion other than the at least one bent molded portion toward the another molded portion after the bending.

12 Claims, 10 Drawing Sheets

F I G. 4
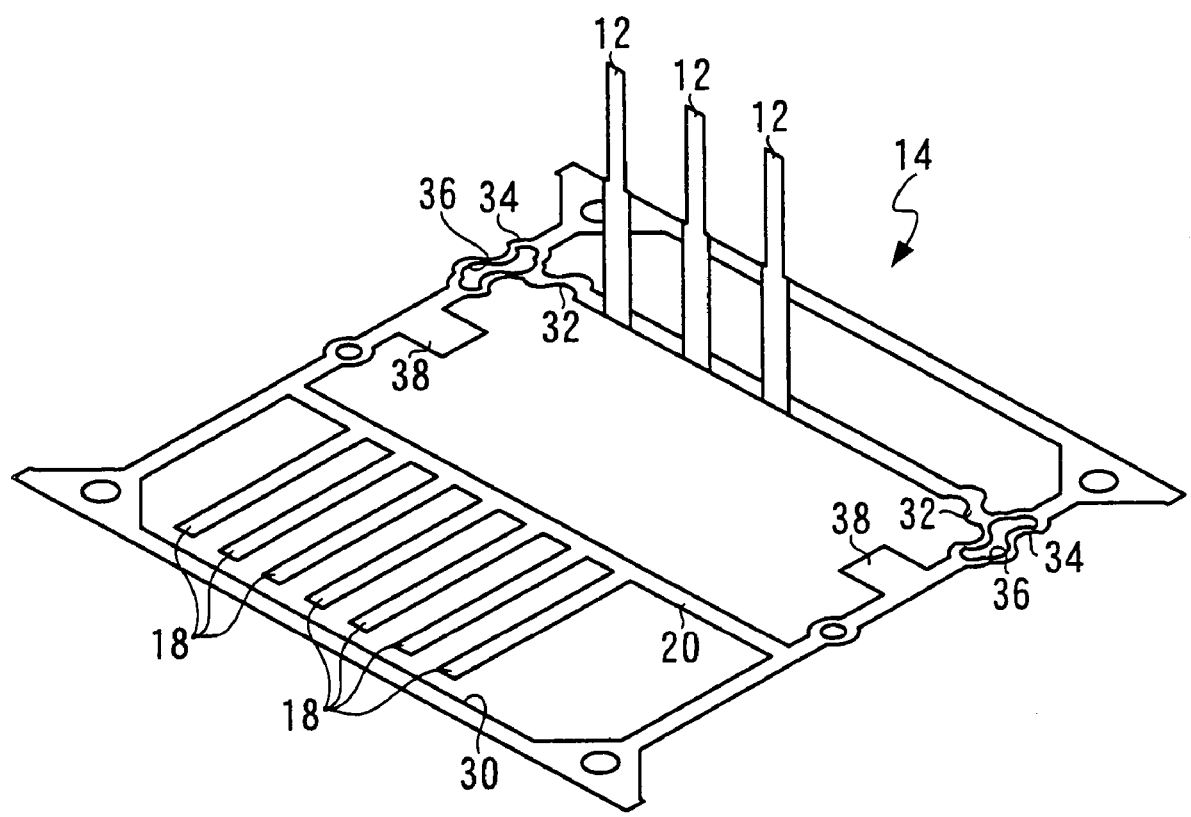

F I G. 5
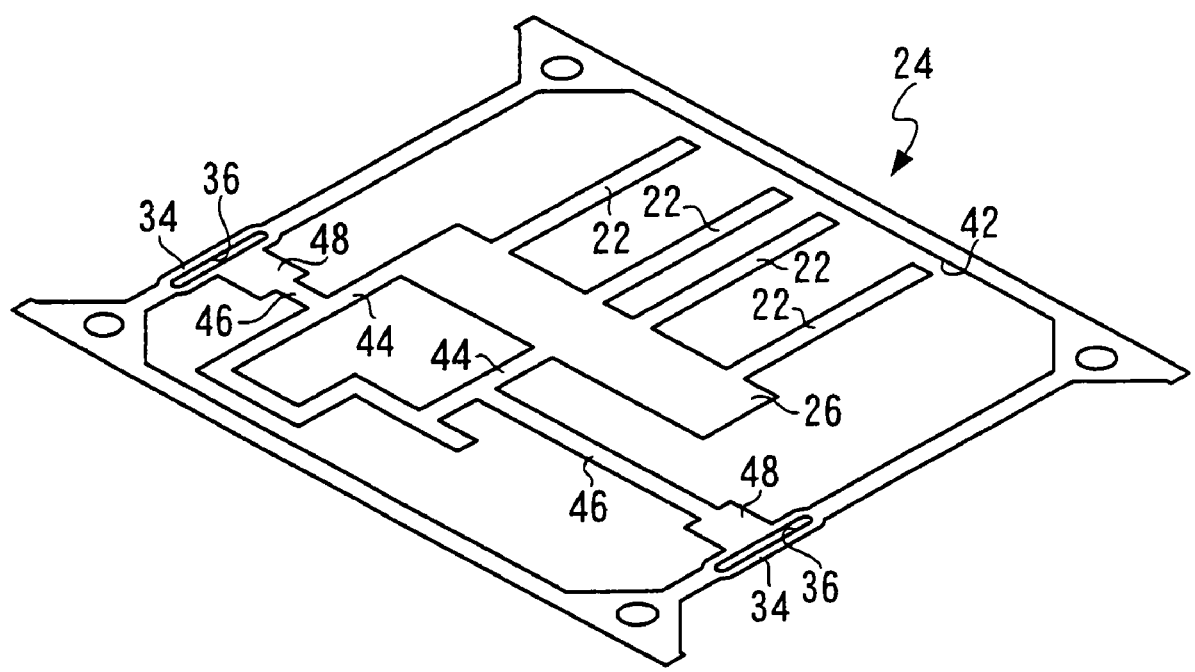

F I G. 10
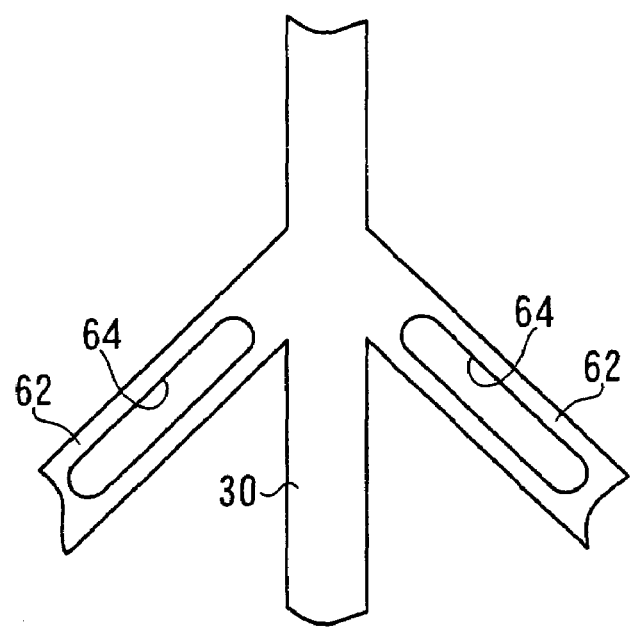
F I G. 11
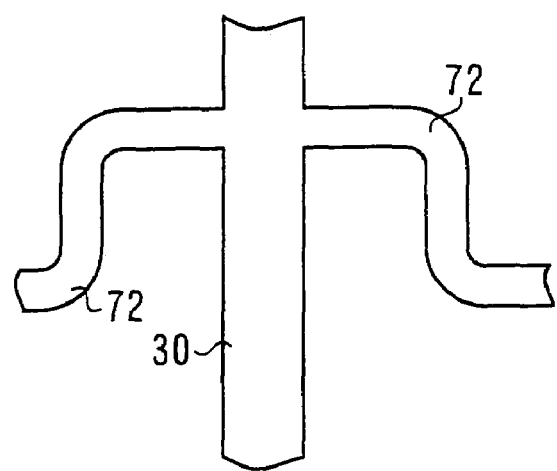

HOOP MOLDING METHOD

CROSS-REFERENCE TO RELATED APPLICATION

This application claims priority under 35 USC 119 from Japanese Patent Application No. 2004-350384, the disclosure of which is incorporated by reference herein.

BACKGROUND OF THE INVENTION

1. Field of the Invention

The present invention relates to a hoop molding method, which is one aspect of a molding method for embedding at least some of molded parts such as metal in a synthetic resin material.

2. Description of the Related Art

Electronic parts such as connectors oftentimes have a structure where some of their metal parts are embedded in a synthetic resin. So-called "hoop molding" is one aspect of a method of molding parts in which some of the metal parts are embedded in the synthetic resin material (for an example of hoop molding, see Japanese Patent Application Publication (JP-A) No. 2001-52556, which is described below).

In hoop molding, a pressing machine and a bending machine are arranged along the longitudinal direction of a long band-like base material, and frame portions are formed in the base material when the base material is fed to these machines from its leading end side. At the inner sides of the frame portions, molded portions are formed in a state where they are connected to the frame portions, and the molded portions are molded into metal parts as a result of being pressed and bent.

After the molded portions, which are intermittently formed in the base material in this state, have been pressed and bent as described above, they are disposed in a die for molding resin, and then some or all of the molded portions are embedded in synthetic resin and the molded portions are cut free from the frame portions.

Hoop molding has the advantage that production efficiency is high because the steps can be automated from the step of molding the molded portions to the step of molding the resin.

However, because hoop molding has a structure where the band-like base material is punched and the molded portions are molded in the frame portions, it is extremely difficult to cause plural molded portions to face each other in the thickness direction of the base material. It is possible to arrange and form plural molded portions in the width direction of the base material inside the same frame portion.

However, because the unbent shape of the molded portions is formed by punching the base material, when plural molded portions are to be arranged and formed in the width direction of the base material in the same frame portion, care must be taken to ensure that the length of one of the molded portions along the width direction of the base material does not overlap that of another molded portion. For this reason, there are many restrictions in terms of the dimensions of the molded portions.

Due to this, when forming parts where plural metal parts are integrally molded with a synthetic resin material, the step of a worker using tongs or the like to arrange and dispose the molded portions at predetermined positions inside the die oftentimes becomes necessary after punching the molded portions from plural base materials, and the advantage in hoop molding that all of the steps can be automated cannot be sufficiently exercised.

In view of the above circumstances, the present invention obtains a hoop molding method where automation is possible even in a structure including plural molded portions.

SUMMARY OF THE INVENTION

A hoop molding method of a first aspect of the invention comprises: arranging and disposing, at the inner side of frame portions plurally formed along the longitudinal direction of a long band-like parent material, plural molded portions along the width direction of the parent material; bending at least one molded portion of the plural molded portions in the thickness direction of the parent material; cutting away the plural molded portions from the frame portions; and partially embedding the plural molded portions in a synthetic resin material, wherein the method includes forming, in the frame portions, connection portions that link, to the frame portions, at least one molded portion of the at least one bent molded portion or at least another molded portion other than the at least one bent molded portion such that it is displaceable in a direction toward another molded portion along the width direction of the parent material, and displacing the at least one molded portion of the at least one bent molded portion or the at least another molded portion other than the at least one bent molded portion toward the another molded portion after the bending.

In the hoop molding method of the first aspect of the invention, the frame portions are plurally formed in the longitudinal direction of the long band-like parent material, and the plural molded portions are arranged and disposed at the inner sides of the frame portions along the width direction of the parent material. At least one of the plural molded portions is bent in the thickness direction of the parent material.

The bent molded portion and any one molded portion of the molded portions not bent are linked by the connection portions to the frame portions such that they are displaceable toward the other molded portions. When the bending ends, the any one molded portion is displaced toward any other molded portion along the width direction of the parent material.

Next, the plural molded portions are disposed inside a die for molding resin, each molded portion is cut away from the frame portions, and the plural molded portions are partially embedded in a synthetic resin material with which the inside of the die is filled.

Here, as described above, in the hoop molding method pertaining to the invention, any one of the molded portions linked to the connection portions is displaced toward any other of the molded portions. For this reason, the molded portions can be linked to the frame portions in a state where the molded portions have not been bent and where both of the molded portions have been separated.

Thus, the molded portions can be disposed inside the same frame portion, even with molded portions where plural molded portions cannot be disposed inside the same frame portion because the plural molded portions overlap each other in the state before they are bent as has conventionally been the case.

For this reason, plural parent materials do not have to be used when disposing the plural molded portions. Because the plural molded portions can be formed from one parent material in this manner, the step of a worker arranging by hand the molded portions inside the die after cutting away the molded portions from plural parent materials can be eliminated.

In the first aspect of the invention, the method may include making the rigidity of at least one of the connection portions and portions of the frame portions in the vicinity of where the frame portions are connected to the connection portions to be lower than that of other portions of the frame portions.

In the hoop molding method of the first aspect of the invention, because the rigidity of at least one of the connection portions and portions of the frame portions in the vicinity of where the frame portions are connected to the connection portions is made lower than that of other portions of the frame portions, the portions with low rigidity are elastically deformed when the molded portions linked to the connection portions are displaced after the bending, and deformation of the other portions of the frame portions can be effectively suppressed.

Thus, the molded portions linked to the connection portions can be reliably displaced toward the bent molded portions without inadvertently causing the other portions of the frame portions to be deformed.

A hoop molding method of a second aspect of the invention comprises: using plural parent materials formed in long band-like shapes where plural frame portions are formed along the longitudinal directions of the parent materials; disposing molded portions at the inner side of each frame portion; cutting away each molded portion of the plural parent materials from the frame portions; and partially embedding the molded portions in the same synthetic resin material, wherein the method includes disposing first linking portions at the inner side of the frame portions of one parent material of the plural parent materials, continuously forming second linking portions in the molded portions of the other parent material of the plural parent materials, cutting away the molded portions from the frame portions of the other parent material together with the second linking portions, and thereafter moving the molded portions toward the one parent material, integrally linking the second linking portions to the first linking portions from one side in the thickness direction of the one parent material, molding resin, and thereafter cutting away the first linking portions and the second linking portions.

According to the hoop molding method of the second aspect of the invention, the frame portions are plurally formed on plural parent materials formed in long band-like shapes along the longitudinal directions of the parent materials, and molded portions that are different per parent material are formed inside the frame portions.

The second linking portions are formed continuously with the molded portions in the other of the plural parent materials, and when the molded portions are cut away from the frame portions together with the second linking portions, they are moved toward one of the plural parent materials, and the molded portions are moved toward the one parent material together with the second linking portions from one side in the thickness direction of the one parent material.

When the molded portions and the second linking portions cut away from the other parent material along the thickness direction of the one parent material in this manner are overlapped, the second linking portions are integrally linked to the first linking portions disposed at the inner side of the one parent material.

In the state where the second linking portions are linked to the first linking portions, the plural molded portions are disposed inside a die for molding resin, the molded portions are cut away from the first linking portions, the second linking portions or the frame portions, and each of the plural molded portions is partially embedded in a synthetic resin material with which the die is filled.

Here, as described above, in the hoop molding method pertaining to the invention, because the second linking portions are linked to the first linking portions, the molded portions originally formed in the other parent material become integrally disposed in one side in the thickness direction of the one parent material with respect to the molded portions formed in the one parent material.

For this reason, in the hoop molding method pertaining to the invention, the hoop molding can essentially be handled in the same manner as hoop molding resulting from one parent material when disposing the molded portions inside the die for molding resin, even in a structure where plural molded portions face each other in the thickness direction of the one parent material. For this reason, the step of arranging and disposing the molded portions in a die for molding resin after the molded portions have been cut away from the parent materials can be eliminated.

A hoop molding method of a third aspect of the invention comprises: forming plural molded portions arranged and disposed along the width direction of a long band-like parent material at the inner sides of frame portions plurally formed along the longitudinal direction of the parent material; forming connection portions that link at least one molded portion of the plural molded portions to the frame portions such that it is displaceable in the direction toward an adjacent molded portion along the width direction of the parent material; bending, in the thickness direction of the parent material, a part of either one of the molded portion linked to the connection portions or the adjacent molded portion, which part is at a side toward the other of the molded portion linked to the connection portions or the adjacent molded portion; displacing the molded portion linked to the connection portions toward the adjacent molded portion; cutting away the plural molded portions from the frame portions; and partially embedding the plural molded portions in a synthetic resin material.

A hoop molding method of a fourth aspect of the invention comprises: forming plural frame portions along the longitudinal directions of plural parent materials formed in long band-like shapes; forming molded portions at the inner side of each of the frame portions; forming first linking portions at the inner sides of the frame portions of one parent material of the plural parent materials; forming second linking portions continuous with the molded portions of the other parent material of the plural parent materials; cutting away the molded portions from the frame portions of the other parent material together with the second linking portions; moving the molded portions toward the one parent material; integrally linking the second linking portions to the first linking portions from one side in the thickness direction of the one parent material; cutting away each molded portion of the plural parent materials from the frame portions and partially embedding the molded portions in the same synthetic resin material; and cutting away the first linking portions and the second linking portions.

As described above, in the hoop molding method pertaining to the invention, the various steps required for molding can be automated even in a structure including plural molded portions.

BRIEF DESCRIPTION OF THE DRAWINGS

A preferred embodiment of the present invention will be described in detail based on the following figures, wherein:

FIG. 4 is a perspective view corresponding to FIG. 2 showing a state where the molded portions to which bending has been administered are displaced toward the molded portions to which bending has not been administered;

FIG. 5 is an enlarged perspective view showing relevant portions of the other parent material used in the hoop molding method pertaining to the embodiment of the invention;

FIG. 10 is a plan view showing a modified example of a fragile portion; and

FIG. 11 is a plan view showing another modified example of the fragile portion.

DETAILED DESCRIPTION OF THE INVENTION

Configuration of the Embodiment

Figure 9:
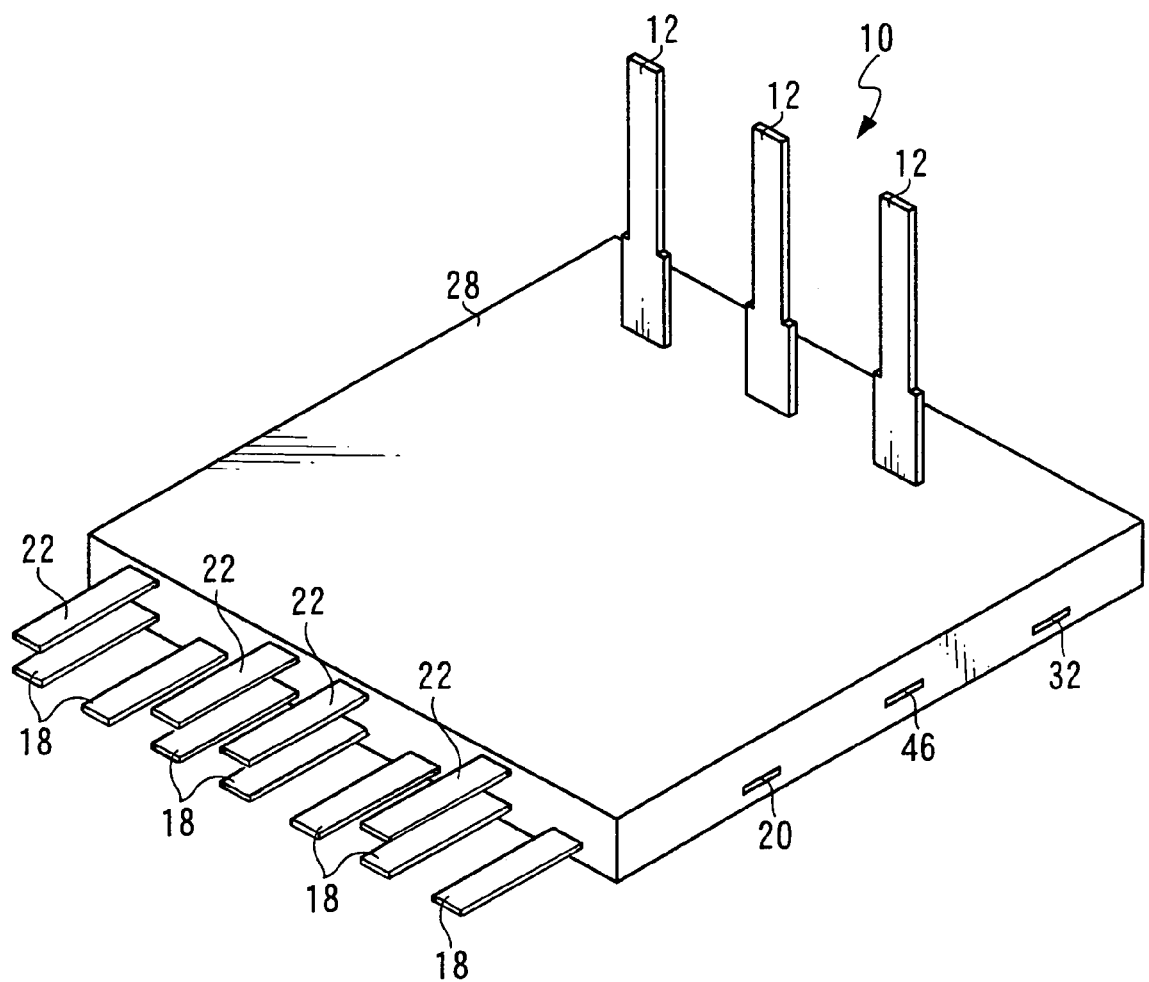
FIG. 9 is a perspective view of a product where resin molding has ended.

A connector 10 that is formed by a hoop molding method pertaining to the embodiment of the invention is shown in perspective view in FIG. 9.

As shown in FIG. 9, the connector 10 includes plural terminals 12, each of which is a part of a molded portion. The plural terminals 12 are formed by punching, by pressing or the like, a long band-like hoop material 14 serving as a parent material shown in FIG. 1.

Figure 1:
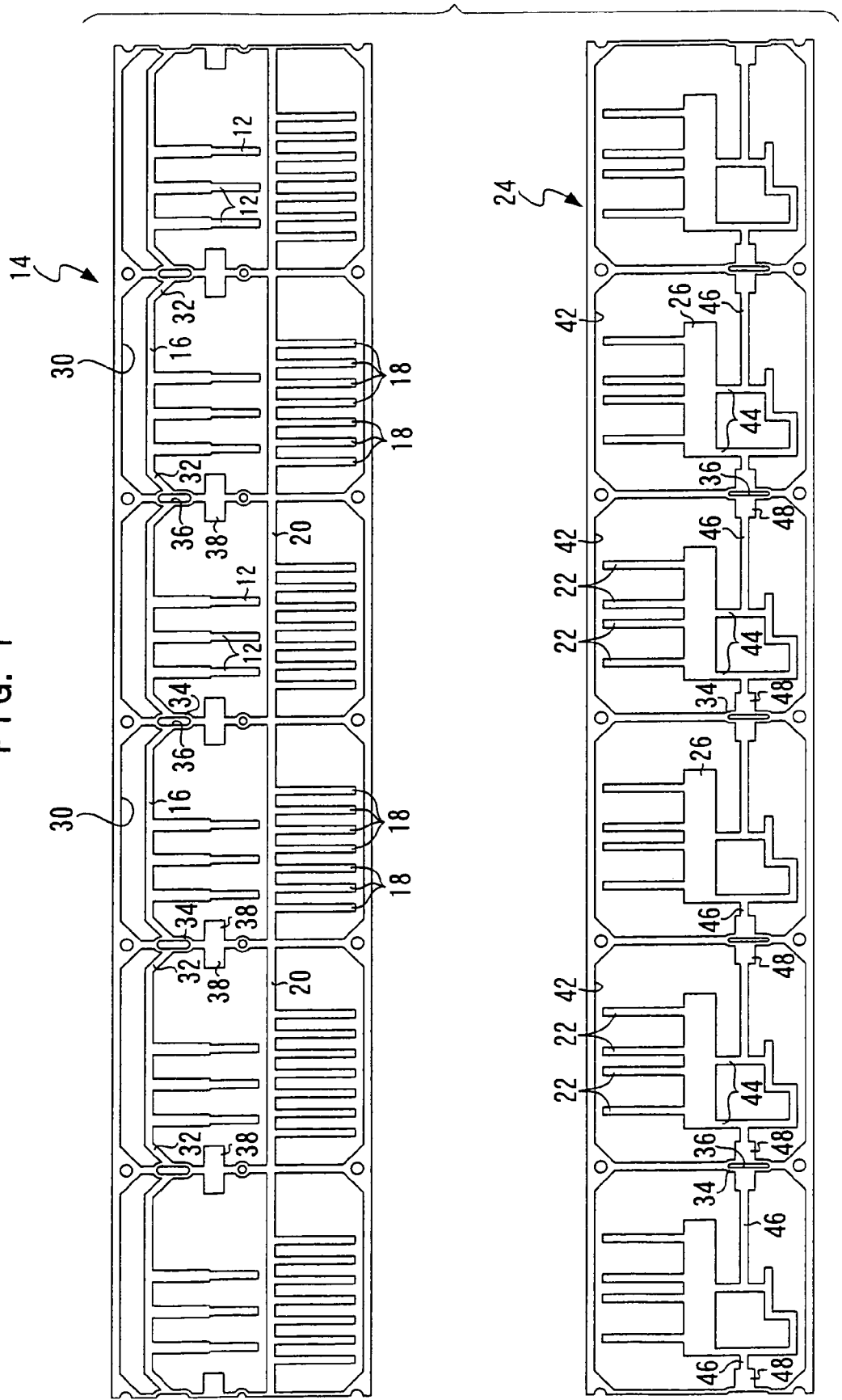
FIG. 1 is a plan view of parent materials used in a hoop molding method pertaining to the embodiment of the invention.

As shown in FIG. 1, the terminals 12 are formed at predetermined intervals along the longitudinal direction of base portions 16, which are long in the longitudinal direction of the hoop material 14, at longitudinal-direction intermediate portions of the base portions 16. Consequently, the terminals 12 are electrically connected, via the base portions 16, at their base end sides.

Figure 3:
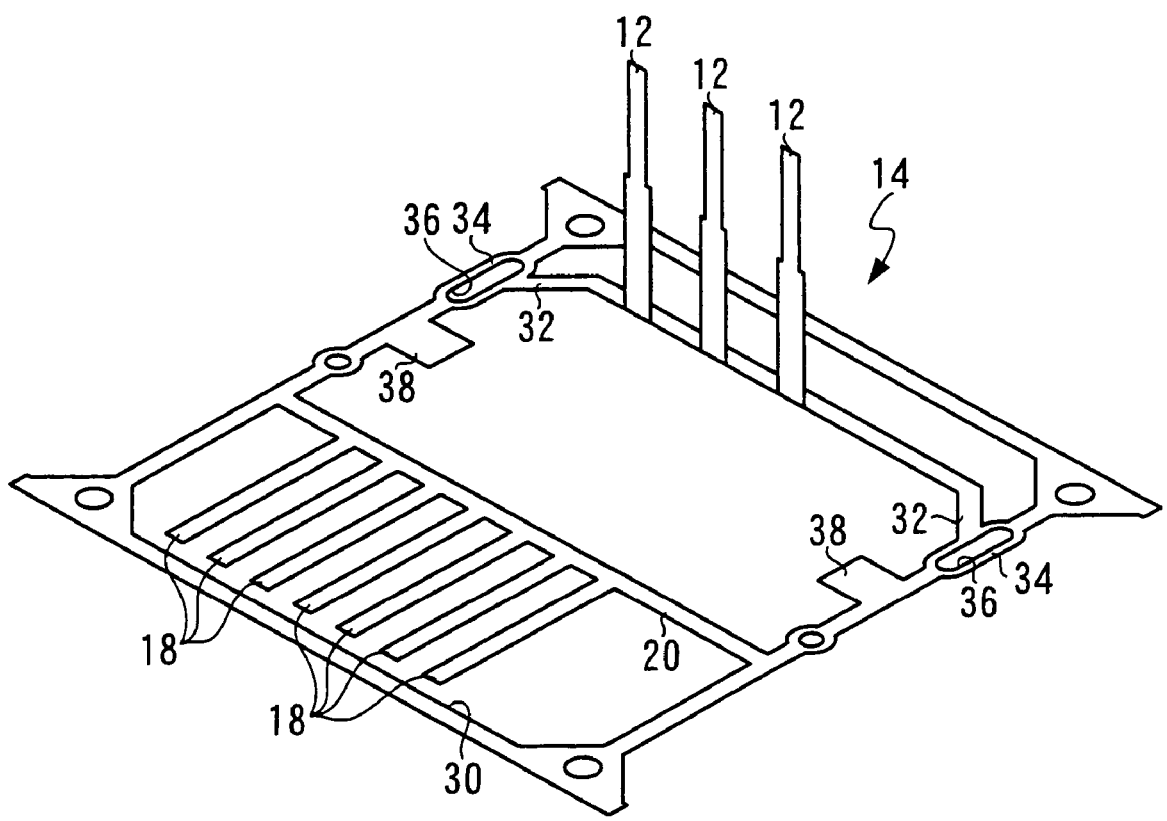
FIG. 3 is a perspective view corresponding to FIG. 2 showing a state where bending is administered to a set of molded portions.

As shown in FIG. 3, the terminals 12 are bent toward one side in the thickness direction of the hoop material 14 around the portions where the terminals 12 are connected to the base portions 16.

As shown in FIG. 9, the connector 10 also includes plural terminals 18, each of which is a part of a molded portion separate from the terminals 12. As shown in FIG. 1, the plural terminals 18 are formed by punching, by pressing or the like, the hoop material 14 at the lateral side of the terminals 12 along the width direction of the hoop material 14.

As shown in FIG. 1, the terminals 18 are formed at predetermined intervals along the longitudinal direction of base portions 20, which are long in the longitudinal direction of the hoop material 14, at longitudinal-direction intermediate portions of the base portions 20. Consequently, the terminals 18 are electrically connected, via the base portions 20, at their base end sides.

In contrast to the terminals 12, the terminals 18 are not bent at the portions where they are connected to the base portions 20, but rather extend from the base portions 20 to one side in the width direction of the hoop material 14.

As shown in FIG. 9, the connector 10 also includes plural terminals 22, each of which is a molded portion separate from the terminals 12 and 18. As shown in FIG. 1, the plural terminals 22 are formed by punching, by pressing or the like, a long band-like hoop material 24 serving as a parent material separate from the hoop material 14.

As shown in FIG. 1, the terminals 22 are formed at predetermined intervals along the longitudinal direction of base portions 26, which are long in the longitudinal direction of the hoop material 24, at longitudinal-direction intermediate portions of the base portions 26. Consequently, the terminals 22 are electrically connected, via the base portions 26, at their base end sides.

The terminals 22 are formed such that they face the terminals 18 along the thickness direction of the connector 10 (i.e., the thickness direction of the hoop materials 14 and 24). However, in the state shown in FIG. 9, the spaces between each of the terminals 12, 18 and 22 are electrically insulated.

The base end sides of the terminals 12, 18 and 22 are embedded in a coating portion 28 that is formed by a block-like synthetic resin material. That is, the terminals 12, 18 and 22 are mechanically and integrally joined together by the coating portion 28 in a state where their leading end sides protrude from the coating portion 28.

Next, the hoop materials 14 and 24 will be described.

As shown in FIG. 1, the hoop material 14 is formed by a metal ribbon, and frame portions 30 are formed at constant intervals along the longitudinal direction of the metal ribbon. The frame portions 30 are formed in substantially rectangular shapes, and the unbent terminals 12, the base portions 16, the terminals 18 and the base portions 20 are formed at the inner side of the frame portions 30. The base portions 20 are connected to inner peripheral portions of the frame portions 30 at both longitudinal-direction end portions of the base portions 20.

Connection portions 32 are disposed between both longitudinal-direction end portions of the base portions 16 and the inner peripheral portions of the frame portions 30. The connection portions 32 are connected to the frame portions 30 at their base end portions and connected to the base portions 16 at their leading end portions. Thus, the base portions 16 and the frame portions 30 are connected.

The connection portions 32 are slanted in the width direction with respect to the longitudinal direction of the hoop material 14 such that their leading end sides are displaced, with respect to their base end sides, in the direction away from the base portions 20 along the width direction of the hoop material 14.

Moreover, the portions of the frame portions 30 to which the base end sides of the connection portions 32 are connected serve as fragile portions 34. The fragile portions 34 have a width dimension that is larger than the width dimension of the other portion of the frame portions 30. However, long holes 36 that are long along the longitudinal direction of the frame portions 30 are formed in the fragile portions 34. For this reason, the dimension of the fragile portions 34 along the width direction of the frame portions 30 further toward one side in the width direction of the frame portions 30 than the long holes 36 is shorter than the other portion of the frame portions 30. For this reason, the mechanical strength of the fragile portions 34 is lower than that of the other portion of the frame portions 30.

Pairs of caulking pieces 38 serving as first linking portions from the frame portions 30 are formed between the connection portions 32 and the base portions 20. The caulking pieces 38 have substantially rectangular shapes when seen in plan view and protrude from the frame portions 30 such that they face each other along the longitudinal direction of the hoop material 14.

Similar to the hoop material 14, the hoop material 24 is formed by a metal ribbon, and frame portions 42 are formed at constant intervals along the longitudinal direction of the metal ribbon. The frame portions 42 are formed in substantially rectangular shapes, and the unbent terminals 22 and the base portions 26 are formed at the inner side of the frame portions 42. Connection pieces 44 extend toward the opposite side of the base portions 26 from the longitudinal-direction intermediate portion and one end portion of each of the base portions 26.

Moreover, connection pieces 46 extend from the longitudinal-direction intermediate portions of the connection pieces 44 toward the inner peripheral portions of the frame portions 42. Caulking pieces 48 serving as second linking portions are formed at the leading end portions of the connection pieces 46. The caulking pieces 48 have substantially rectangular shapes when seen in plan view and are formed such that they face each other along the longitudinal direction of the hoop material 24. The end portions of the caulking pieces 48 at the opposite side of the connection pieces 46 are connected to fragile portions 34 formed in the frame portions 42.

Action and Effects of the Embodiment

Next, the action and effects of the present embodiment will be described through description of the hoop molding method pertaining to the present embodiment.

In the hoop molding method pertaining to the present embodiment, the hoop materials 14 and 24 are set such that they can be pulled out from their leading end sides in a state where their base end sides are taken up. Moreover, the pulled-out hoop materials 14 and 24 are arranged such that they are parallel to each other in a state where there is a constant interval between them along their width direction (see FIG. 1).

Figure 2:
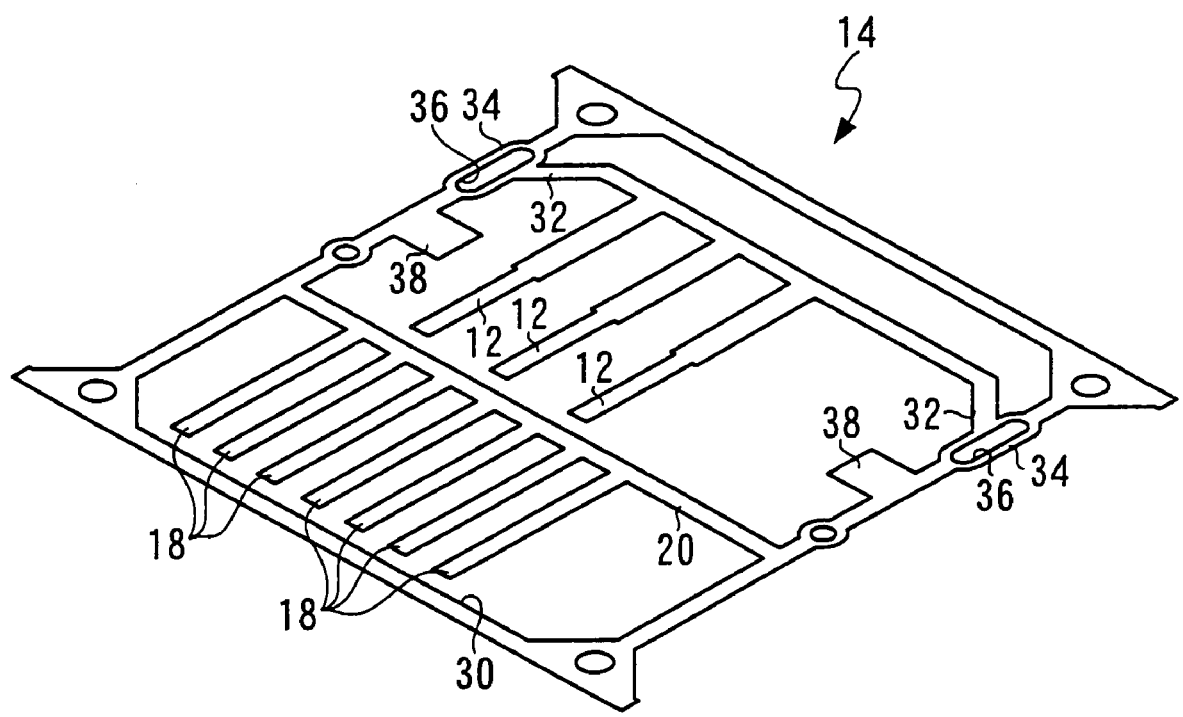
FIG. 2 is an enlarged perspective view showing relevant portions of one of the parent materials used in the hoop molding method pertaining to the embodiment of the invention.

As shown in FIG. 2, with respect to the hoop material 14 of the hoop materials 14 and 24 arranged in this manner, the frame portions 30, the unbent terminals 12, the base portions 16, the terminals 18, the base portions 20, the connection portions 32 and the fragile portions 34, or an intermediate state of each of the portions (i.e., a state where the terminals 12 and the terminals 18 have not been individually formed but where each of the terminals 12 and the terminals 18 is formed by punching in a later step), are sequentially formed by punching resulting from pressing from the leading end side of the hoop material 14.

As shown in FIG. 3, the terminals 12 formed in this manner are bent around the portions where they are connected to the base portions 16 such that their longitudinal direction is oriented in the thickness direction of the hoop material 14. Because the terminals 12 are bent in this manner, a space is formed between the base portions 20 and the base portions 16.

Next, pressure is applied to the base portions 16 in the direction toward the base portions 20 along the width direction of the hoop material 14. When pressure is applied to the base portions 16 in this manner, plastic deformation arises in the connection portions 32 and the fragile portions 34, such that the base end portions 16 and the terminals 12 are displaced toward the base portions 20, as shown in FIG. 4.

As shown in FIG. 5, with respect to the hoop material 24, the frame portions 42, the unbent terminals 22, the base portions 26, the connection pieces 44 and 46 and the fragile portions 34, or an intermediate state of each of the portions, are sequentially formed by punching resulting from pressing from the leading end side of the hoop material 24.

Figure 6:
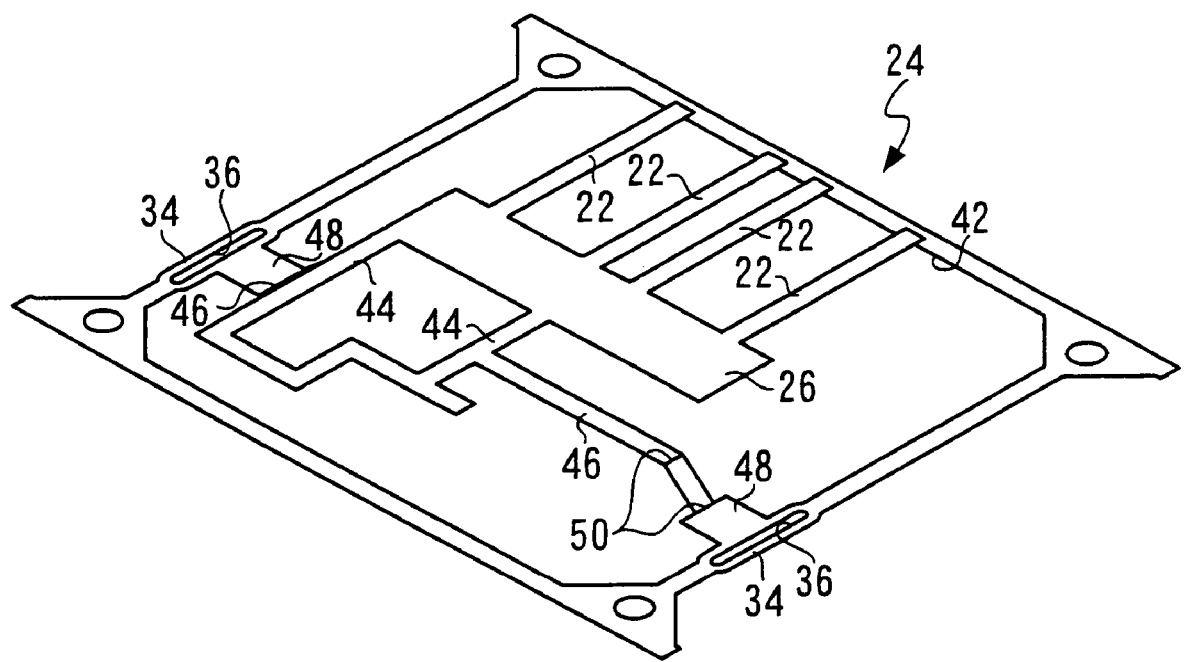
FIG. 6 is a perspective view corresponding to FIG. 5 showing a state where the molded portions are displaced with respect to a frame portion in the thickness direction of the parent material.

Next, as shown in FIG. 6, the portion further toward the inner side of the frame portion 42 than the connection pieces 46 is press-molded by pressing toward one side in the thickness direction of the hoop material 24. Thus, bent portions 50, whose axial direction is in the width direction, are formed in the connection pieces 46 such that the terminals 22, the base portions 26 and the connection pieces 44 are displaced further toward one side in the thickness direction of the hoop material 24 than the frame portions 30.

Figure 7:
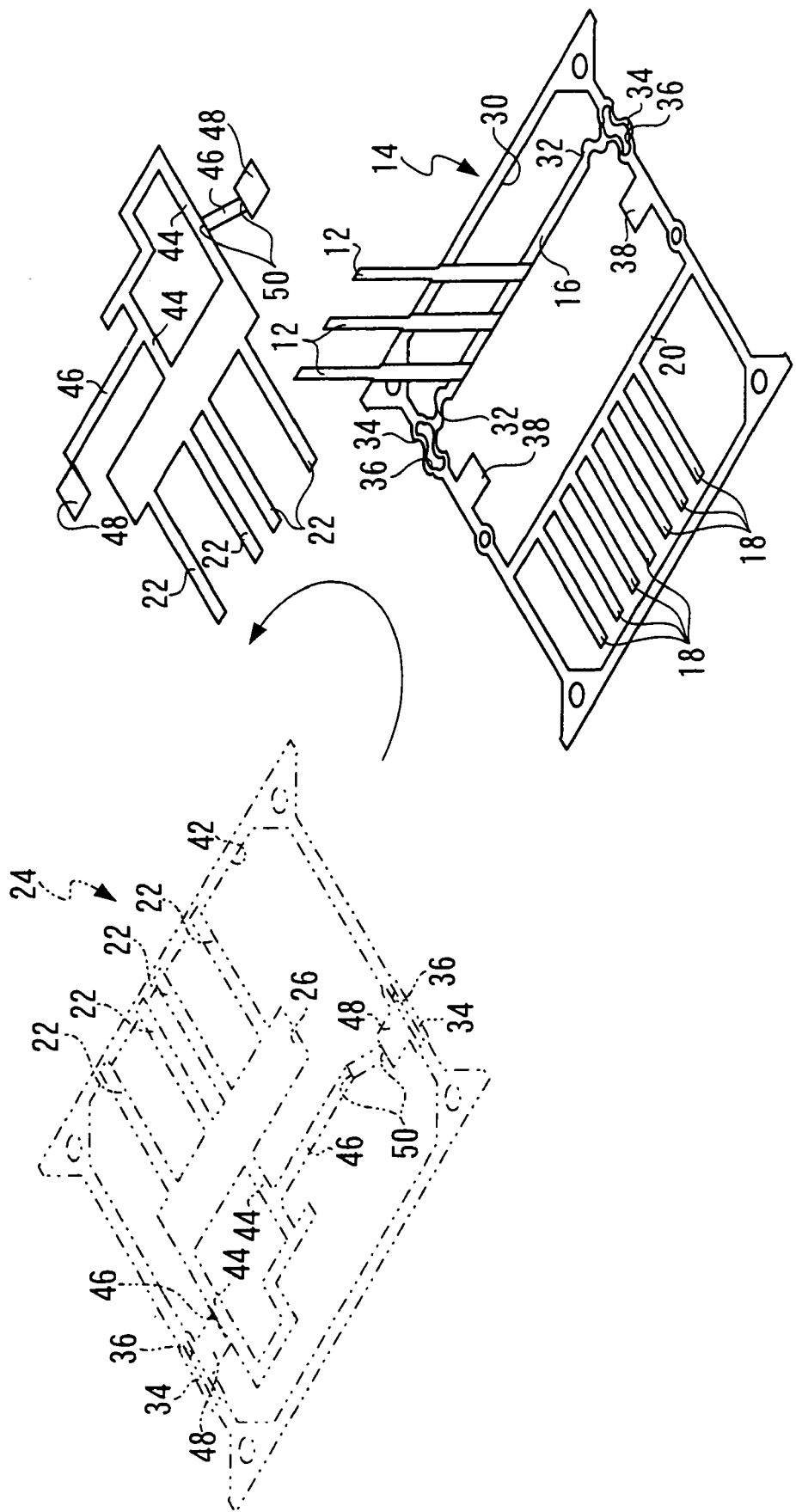
FIG. 7 is a perspective view showing a state where the molded portion is cut free from the other parent material and where the molded portion of another hoop material is rotated and conveyed toward the one parent material.

Next, as indicated by the change from the dotted lines to the solid lines in FIG. 7, the portions between the caulking pieces 48 and the fragile portions 34 of the hoop material 24 formed as described above are cut, whereby the terminals 22, the base portions 26, the connection pieces 44 and 46, and the caulking pieces 48 are cut free from the hoop material 24.

Moreover, the terminals 22, the base portions 26, the connection pieces 44 and 46, and the caulking pieces 48 cut free from the hoop material 24 are conveyed to a position where the caulking pieces 38 and the caulking pieces 48 face each other at one side in the thickness direction of the hoop material 14 by an unillustrated rotational conveyance unit such as a turntable that is rotatable around an axis in which the thickness direction of the hoop materials 14 and 24 serves as the axial direction.

Figure 8:
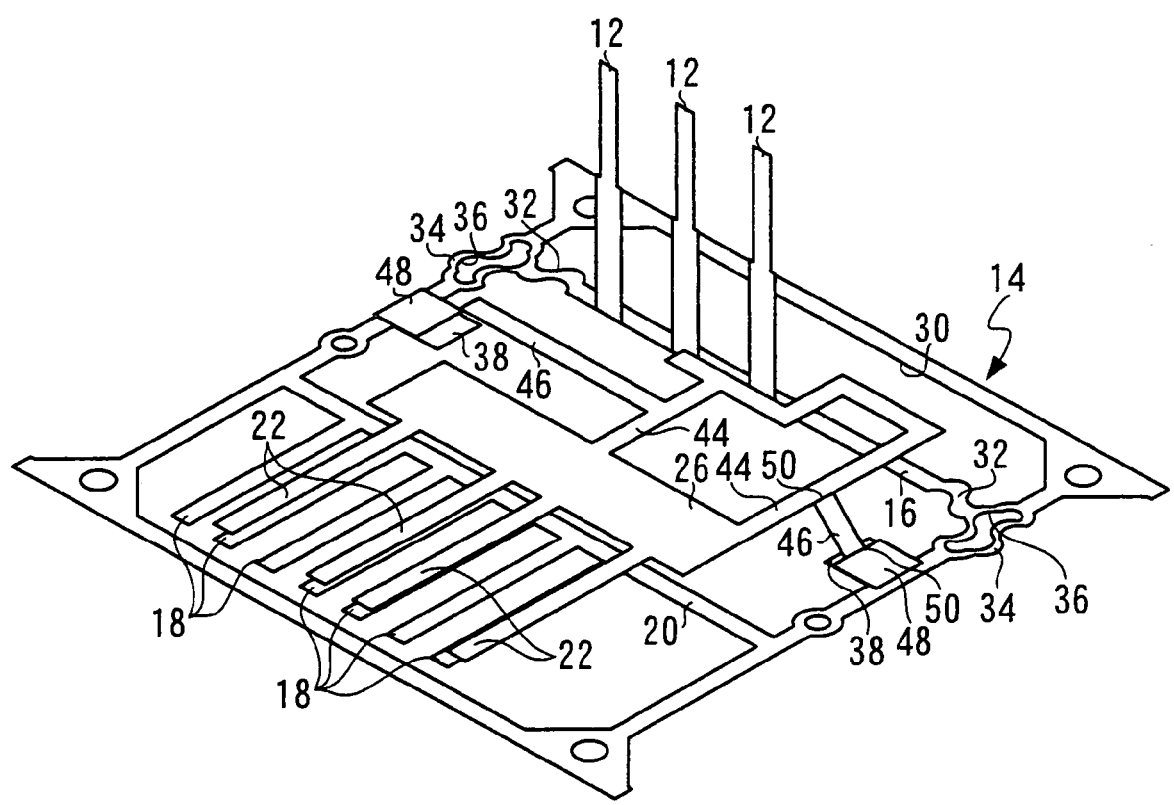
FIG. 8 is a perspective view showing a state where a first linking portion and a second linking portion are linked together.

Next, in this state, the terminals 22, the base portions 26, the connection pieces 44 and 46, and the caulking pieces 48 are moved toward the hoop material 14 along the thickness direction of the hoop material 14, and the caulking pieces 38 and the caulking pieces 48 are brought into contact with each other along the thickness direction of the hoop material 14. In the state where the caulking pieces 38 and 48 are in contact with each other, the caulking pieces 38 and 48 are caulked, so that the caulking pieces 38 and 48 are mechanically and integrally joined together as shown in FIG. 8.

In the state where the terminals 22, the base portions 26, the connection pieces 44 and 46, and the caulking pieces 48 have been integrally linked in this manner, the frame portion 30 is disposed inside an unillustrated die, and the die is filled with a synthetic resin material in this state. The synthetic resin material inside the die hardens, whereby the coating portion 28 is formed. In a state where the coating portion 28 has been formed in this manner, the connection portions 32, the base portion 20 and the connection pieces 46 protruding from the coating portion 28 are cut away. Thus, the spaces between each of the terminals 12, 18 and 22 are insulated.

Here, in the hoop molding method pertaining to the present embodiment, the bent terminals 12 are forcibly displaced together with the base portion 16 toward the base portion 20. Because the terminals 12 are displaced in this manner, the terminals 12 can be formed at positions where their leading ends do not overlap the base portion 20 and the terminals 18, even if the unbent terminals 12 are set to be longer than the interval to the base portion 20 from where the fragile portions 34 and the connection portions 32 are connected, for example.

Thus, the terminals 12 and the terminals 18 can be formed inside the same frame portion 30, and the work of separately preparing the terminals 12 and the terminals 18 in advance and disposing the terminals 12 and 18 inside a die for molding resin can be eliminated.

Also, in the hoop molding method pertaining to the present embodiment, the mutually different hoop materials 14 and 24 are used, the terminals 12 and 18 and the base portions 16 and 20 are formed from the hoop material 14, and the terminals 22 and the base portion 26 are formed from the hoop material 24.

However, the terminals 22 and the base portion 26 punched out from the hoop material 24 are connected to the caulking pieces 48 via the connection pieces 44 and 46, and the caulking pieces 48 are integrally joined to the caulking pieces 38 of the hoop material 14, so that the result is the same as if the terminals 22 and the base portion 26 had been formed in the hoop material 14.

Thus, because the terminals 12, 18 and 22 can be disposed inside the die for molding resin in a state where the terminals 12, 18 and 22 are mechanically and integrally coupled together, the work of separately preparing the terminals 12 and 18 and the terminals 22 in advance and disposing the terminals 12 and 18 and the terminals 22 inside a die for molding resin can be eliminated.

Also, although the step of individually disposing the terminals 12, 18 and 22 inside the die for molding resin is done by the hand of a worker, as described above, the terminals 12, 18 and 22 can be disposed inside the die for molding resin in a state where the terminals 12, 18 and 22 are mechanically and integrally coupled together. Thus, the work of disposing the terminals 12, 18 and 22 inside the die can be automated, whereby the number of man-hours can be significantly reduced and production efficiency can be significantly improved.

Moreover, as described above, because the hoop materials 14 and 24 are disposed parallel to each other, the terminals 22, the base portions 26, the connection pieces 44 and 46, and the caulking pieces 48 cut away from the hoop material 24 are conveyed toward one side in the thickness direction of the hoop material 14 by the rotational conveyance unit.

For this reason, the entire process of cutting away from the hoop material 24 the terminals 22, the base portion 26, the connection pieces 44 and 46, and the caulking pieces 48, their conveyance toward the hoop material 14, and the joining together of the caulking pieces 38 and 48 with caulking can be easily automated, so that in this respect also, production efficiency can be improved.

In the present embodiment, the fragile portions 34 were formed in the frame portion 30 separately from the connection portions 32. However, as shown in FIG. 10 for example, connection portions 64, in whose width-direction intermediate portions long holes 62 are formed, may be disposed instead of the connection portions 32, and the mechanical strength of the connection portions 64 may be made lower than that of other sites of the frame portion 30 and the like, so that the connection portions 64 are reliably plastically deformed when the terminals 12 and the base portion 16 are displaced toward the base portion 20.

Also, as shown in FIG. 11, instead of the connection portions 64 including the long holes 62, connection portions 72, whose mechanical strength is made lower than that of other sites by making their width narrower than that of the frame portion 30, may be disposed instead of the connection portions 32.

The present invention has been described above in regard to a specific embodiment, but the invention should not be construed as being limited to this embodiment.

That is, a hoop molding method of a first aspect of the invention comprises: arranging and disposing, at the inner side of frame portions plurally formed along the longitudinal direction of a long band-like parent material, plural molded portions along the width direction of the parent material; bending at least one molded portion of the plural molded portions in the thickness direction of the parent material; cutting away the plural molded portions from the frame portions; and partially embedding the plural molded portions in a synthetic resin material, wherein the method includes forming, in the frame portions, connection portions that link, to the frame portions, at least one molded portion of the at least one bent molded portion or at least another molded portion other than the at least one bent molded portion such that it is displaceable in a direction toward another molded portion along the width direction of the parent material, and displacing the at least one molded portion of the at least one bent molded portion or the at least another molded portion other than the at least one bent molded portion toward the another molded portion after the bending.

Moreover, in the first aspect of the invention, the molding of the molded portions may include forming base portions connected to inner peripheral portions of the frame portions at both longitudinal-direction end portions that are long in the longitudinal direction of the parent material and forming plural terminals that are long in the width direction at predetermined intervals along the longitudinal direction of the base portions at longitudinal-direction intermediate portions of the base portions.

Moreover, in the first aspect of the invention, the connection portions may link the base portions and the frame portions, the sides of the connection portions connected to the base portions are slantingly formed in the width direction with respect to the longitudinal direction of the parent material such that the connection portions are displaced in the direction away from an adjacent group of molded portions in the direction in which the terminals extend along the width direction of the parent material, and the length of the terminals are formed longer than the interval to the adjacent group of molded portions from the portions where the frame portions and the connection portions are connected.

Moreover, in the first aspect of the invention, the method may include making the rigidity of at least one of the connection portions and portions of the frame portions in the vicinity of where the frame portions are connected to the connection portions to be lower than that of other portions of the frame portions.

Moreover, in the first aspect of the invention, the method may include forming holes in width-direction intermediate portions of the portions of the frame portions in the vicinity of where the frame portions are connected to the connection portions.

Moreover, in the first aspect of the invention, the method may include forming holes in width-direction intermediate portions of the connection portions.

Moreover, in the first aspect of the invention, the method may include forming the width of the connection portions narrower than the width of the frame portions.

A hoop molding method of a second aspect of the invention comprises: using plural parent materials formed in long band-like shapes where plural frame portions are formed along the longitudinal directions of the parent materials; disposing molded portions at the inner side of each frame portion; cutting away each molded portion of the plural parent materials from the frame portions; and partially embedding the molded portions in the same synthetic resin material, wherein the method includes disposing first linking portions at the inner side of the frame portions of one parent material of the plural parent materials, continuously forming second linking portions in the molded portions of the other parent material of the plural parent materials, cutting away the molded portions from the frame portions of the other parent material together with the second linking portions, and thereafter moving the molded portions toward the one parent material, integrally linking the second linking portions to the first linking portions from one side in the thickness direction of the one parent material, molding resin, and thereafter cutting away the first linking portions and the second linking portions.

Moreover, in the second aspect of the invention, the method may include, after forming the second linking portions, bending some of the molded portions continuous with the formation of the second linking portions, to thereby displace the molded portions toward the side opposite from the side linked to the first linking portions with respect to the thickness direction of the parent materials.

Moreover, in the second aspect of the invention, the linking of the first linking portions and the second linking portions may include disposing the molded portions of the one parent material and the molded portions of the other parent material such that they face each other in the thickness direction of the parent materials.

A hoop molding method of a third aspect of the invention comprises: forming plural molded portions arranged and disposed along the width direction of a long band-like parent material at the inner sides of frame portions plurally formed along the longitudinal direction of the parent material; forming connection portions that link at least one molded portion of the plural molded portions to the frame portions such that it is displaceable in the direction toward an adjacent molded portion along the width direction of the parent material; bending, in the thickness direction of the parent material, a part of either one of the molded portion linked to the connection portions or the adjacent molded portion, which part is at a side toward the other of the molded portion linked to the connection portions or the adjacent molded portion; displacing the molded portion linked to the connection portions toward the adjacent molded portion; cutting away the plural molded portions from the frame portions; and partially embedding the plural molded portions in a synthetic resin material.

Moreover, in the third aspect of the invention, the molding of the molded portions may include forming base portions connected to inner peripheral portions of the frame portions at both longitudinal-direction end portions that are long in the longitudinal direction of the parent material and forming plural terminals that are long in the width direction at predetermined intervals along the longitudinal direction of the base portions at longitudinal-direction intermediate portions of the base portions.

Moreover, in the third aspect of the invention, the connection portions may link the base portions and the frame portions, the sides of the connection portions connected to the base portions are slantingly formed in the width direction with respect to the longitudinal direction of the parent material such that the connection portions are displaced in the direction away from an adjacent molded portion in the direction in which the terminals extend along the width direction of the parent material, and the length of the terminals are formed longer than the interval to the adjacent molded portion from the portions where the frame portions and the connection portions are connected.

Moreover, in the third aspect of the invention, the method may include making the rigidity of at least one of the connection portions and portions of the frame portions in the vicinity of where the frame portions are connected to the connection portions to be lower than that of other portions of the frame portions.

Moreover, in the third aspect of the invention, the method may include forming holes in width-direction intermediate portions of the portions of the frame portions in the vicinity of where the frame portions are connected to the connection portions.

Moreover, in the third aspect of the invention, the method may include forming holes in width-direction intermediate portions of the connection portions.

Moreover, in the third aspect of the invention, the method may include forming the width of the connection portions narrower than the width of the frame portions.

A hoop molding method of a fourth aspect of the invention comprises: forming plural frame portions along the longitudinal directions of plural parent materials formed in long band-like shapes; forming molded portions at the inner side of each of the frame portions; forming first linking portions at the inner sides of the frame portions of one parent material of the plural parent materials; forming second linking portions continuous with the molded portions of the other parent material of the plural parent materials; cutting away the molded portions from the frame portions of the other parent material together with the second linking portions; moving the molded portions toward the one parent material; integrally linking the second linking portions to the first linking portions from one side in the thickness direction of the one parent material; cutting away each molded portion of the plural parent materials from the frame portions and partially embedding the molded portions in the same synthetic resin material; and cutting away the first linking portions and the second linking portions.

Moreover, in the fourth aspect of the invention, the method may include, after forming the second linking portions, bending some of the molded portions continuous with the formation of the second linking portions, to thereby displace the molded portions toward the side opposite from the side linked to the first linking portions with respect to the thickness direction of the parent materials.

Moreover, in the fourth aspect of the invention, the linking of the first linking portions and the second linking portions may include disposing the molded portions of the one parent material and the molded portions of the other parent material such that they face each other in the thickness direction of the parent materials.

What is claimed is:

1. A hoop molding method comprising:

arranging and disposing, at the inner side of frame portions plurally formed along the longitudinal direction of a long band-like parent material, plural molded portions which are substantially coplanar along the width direction of the parent material;

bending at least one molded portion of the plural molded portions in the thickness direction of the parent material such that bent and unbent molded portions are formed, wherein said unbent molded portions remain substantially coplanar;

cutting away the plural molded portions from the frame portions; and partially embedding the plural molded portions in a synthetic resin material, wherein the method further includes forming, in the frame portions, connection portions that link, to the frame portions, at least one molded portion of the at least one bent molded portion or at least one other molded portion other than the at least one bent molded portion such that the at least one molded portion of the at least one bent molded portion or the at least one other molded portion is displaceable in a direction toward another molded portion along the width direction of the parent material, and displacing the connection portions such that the at least one molded portion of the at least one bent molded portion or the at least one other molded portion other than the at least one bent molded portion is displaced toward the another molded portion after the bending in only a width direction such that unbent molded portions of said plural molded portions remain substantially coplanar.

2. The hoop molding method of claim 1, wherein the arranging and disposing of the plural molded portions comprises forming base portions connected to inner peripheral portions of the frame portions at both longitudinal-direction end portions that are long in the longitudinal direction of the parent material and forming plural terminals that are long in the width direction at predetermined intervals along the longitudinal direction of the base portions at longitudinal-direction intermediate portions of the base portions.

3. The hoop molding method of claim 2, wherein the connection portions link the base portions and the frame portions, the sides of the connection portions connected to the base portions are slantingly formed in the width direction with respect to the longitudinal direction of the parent material such that the connection portions are displaced in the direction away from an adjacent group of molded portions in the direction in which the terminals extend along the width direction of the parent material, and the length of the terminals are formed longer than the interval to the adjacent group of molded portions from the portions where the frame portions and the connection portions are connected.

4. The hoop molding method of claim 1, further comprising making the rigidity of at least one of the connection portions and portions of the frame portions in the vicinity of where the frame portions are connected to the connection portions to be lower than that of other portions of the frame portions.

5. The hoop molding method of claim 4, further comprising forming holes in width-direction intermediate portions of the portions of the frame portions in the vicinity of where the frame portions are connected to the connection portions.

6. The hoop molding method of claim 4, further comprising forming holes in width-direction intermediate portions of the connection portions.

7. The hoop molding method of claim 4, further comprising forming the width of the connection portions narrower than the width of the frame portions.

8. The hoop molding method of claim 1, wherein the amount of width direction displacement of the connection portions would result in an overlap between the at least one bent molded portion and the another molded portion if the at least one bent molded portion were not bent.

9. The hoop molding method of claim 1, wherein each of the plural molded portions along the width direction of the parent material is substantially planar.

10. A hoop molding method comprising:
arranging and disposing, at the inner side of frame portions plurally formed along the longitudinal direction of a long band-like parent material, plural molded portions along the width direction of the parent material;
bending at least one molded portion of the plural molded portions in the thickness direction of the parent material;
cutting away the plural molded portions from the frame portions; and
partially embedding the plural molded portions in a synthetic resin material,
wherein the method further includes
forming, in the frame portions, connection portions that link, to the frame portions, at least one molded portion of the at least one bent molded portion or at least one other molded portion other than the at least one bent molded portion such that the at least one molded portion of the at least one bent molded portion or the at least one other molded portion is displaceable in a direction toward another molded portion along the width direction of the parent material, and
displacing the at least one molded portion of the at least one bent molded portion or the at least one other molded portion other than the at least one bent molded portion toward the another molded portion after the bending,
wherein the arranging and disposing of the plural molded portions comprises forming base portions connected to inner peripheral portions of the frame portions at both longitudinal-direction end portions that are long in the longitudinal direction of the parent material and forming plural terminals that are long in the width direction at predetermined intervals along the longitudinal direction of the base portions at longitudinal-direction intermediate portions of the base portions, and
wherein the connection portions link the base portions and the frame portions, the sides of the connection portions connected to the base portions are slantingly formed in the width direction with respect to the longitudinal direction of the parent material such that the connection portions are displaced in the direction away from an adjacent group of molded portions in the direction in which the terminals extend along the width direction of the parent material, and the length of the terminals are formed longer than the interval to the adjacent group of molded portions from the portions where the frame portions and the connection portions are connected.

11. A hoop molding method comprising:
arranging and disposing, at the inner side of frame portions plurally formed along the longitudinal direction of a long band-like parent material, plural molded portions along the width direction of the parent material;
bending at least one molded portion of the plural molded portions in the thickness direction of the parent material;
cutting away the plural molded portions from the frame portions; and
partially embedding the plural molded portions in a synthetic resin material,
wherein the method further includes
forming, in the frame portions, connection portions that link, to the frame portions, at least one molded portion of the at least one bent molded portion or at least one other molded portion other than the at least one bent molded portion such that the at least one molded portion of the at least one bent molded portion or the at least one other molded portion is displaceable in a direction toward another molded portion along the width direction of the parent material, and
displacing the at least one molded portion of the at least one bent molded portion or the at least one other molded portion other than the at least one bent molded portion toward the another molded portion after the bending,
wherein the arranging and disposing of the plural molded portions comprises forming base portions connected to inner peripheral portions of the frame portions, and
wherein the connection portions link the base portions and the frame portions, the sides of the connection portions connected to the base portions are slantingly formed in the width direction with respect to the longitudinal direction of the parent material such that the connection portions are displaced in the direction away from an adjacent group of molded portions in the direction in which the terminals extend along the width direction of the parent material.

12. The hoop molding method of claim 11, wherein the length of the terminals are formed longer than the interval to the adjacent group of molded portions from the portions where the frame portions and the connection portions are connected.

* * * * *